(12) United States Patent
Eidenberger et al.

(10) Patent No.: US 10,570,589 B2
(45) Date of Patent: Feb. 25, 2020

(54) METHOD AND DEVICE FOR DETERMINING AN N+1-DIMENSIONAL ENVIRONMENT MODEL AND MINING APPARATUS

(71) Applicant: SIEMENS INDUSTRY, INC., Alpharetta, GA (US)

(72) Inventors: Robert Eidenberger, München (DE); Daniel W. Robertson, Cumming, GA (US); Julian D. Jaeger, Atlanta, GA (US); Thomas Wösch, München (DE)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 191 days.

(21) Appl. No.: 15/115,169

(22) PCT Filed: Jan. 26, 2015

(86) PCT No.: PCT/US2015/012839
§ 371 (c)(1),
(2) Date: Jul. 28, 2016

(87) PCT Pub. No.: WO2015/116516
PCT Pub. Date: Aug. 6, 2015

(65) Prior Publication Data
US 2016/0340873 A1    Nov. 24, 2016

Related U.S. Application Data

(60) Provisional application No. 61/933,623, filed on Jan. 30, 2014.

(51) Int. Cl.
*E02F 9/26* (2006.01)
*G01S 17/42* (2006.01)
(Continued)

(52) U.S. Cl.
CPC ............... *E02F 9/264* (2013.01); *E02F 3/43* (2013.01); *G01S 7/4817* (2013.01); *G01S 17/42* (2013.01); *G01S 17/89* (2013.01)

(58) Field of Classification Search
CPC ... E02F 9/264; E02F 3/43; E02F 3/308; E02F 3/435; G01C 15/00; G01S 17/42;
(Continued)

(56) References Cited

U.S. PATENT DOCUMENTS

| | | | | |
|---|---|---|---|---|
| 5,907,111 A | * | 5/1999 | Josten | E02F 9/264 73/866.5 |
| 6,223,110 B1 | * | 4/2001 | Rowe | E02F 3/435 111/177 |
| 6,247,538 B1 | | 6/2001 | Takeda et al. | |

(Continued)

FOREIGN PATENT DOCUMENTS

| | | |
|---|---|---|
| CL | 201302201 | 12/2013 |
| CN | 1970894 A | 5/2007 |

(Continued)

*Primary Examiner* — Jason Holloway (57) ABSTRACT

A method for determining an N+1-dimensional environmental model is provided. According to the method, environmental information in N dimensions is determined using a sensor. In a further step, position and/or orientation of the sensor is/are determined. Then, the N+1-dimensional environmental model is determined based on the determined environmental information in N dimensions and the determined position and/or orientation of the sensor. Further, a device and a mining apparatus are provided.

9 Claims, 8 Drawing Sheets

(51) Int. Cl.
*G01S 17/89* (2020.01)
*G01S 7/481* (2006.01)
*E02F 3/43* (2006.01)

(58) Field of Classification Search
CPC ...... G01S 7/497; G01S 7/4817; G01S 7/4808; G01S 17/89; G01S 17/50
See application file for complete search history.

(56) References Cited

U.S. PATENT DOCUMENTS

| | | | |
|---|---|---|---|
| 6,691,437 B1* | 2/2004 | Yost | E02F 3/435 |
| | | | 356/141.2 |
| 7,328,220 B2 | 2/2008 | Dobra et al. | |
| 2004/0088138 A1 | 5/2004 | Mann | |
| 2005/0187731 A1* | 8/2005 | Ericsson | E02F 3/842 |
| | | | 702/92 |
| 2005/0246133 A9* | 11/2005 | Mann | E02F 3/26 |
| | | | 702/175 |
| 2008/0282583 A1 | 11/2008 | Koellner et al. | |
| 2010/0223008 A1 | 9/2010 | Dunbabin et al. | |
| 2011/0311342 A1* | 12/2011 | Montgomery | G01C 21/04 |
| | | | 414/685 |
| 2014/0330508 A1* | 11/2014 | Montgomery | G01C 21/04 |
| | | | 701/408 |
| 2016/0340873 A1 | 11/2016 | Eidenberger et al. | |

FOREIGN PATENT DOCUMENTS

| | | |
|---|---|---|
| CN | 101535573 A | 9/2009 |
| CN | 103492972 A | 1/2014 |
| EP | 2490092 A1 | 8/2012 |
| RU | 2100844 C1 | 12/1997 |
| WO | 9530880 A1 | 11/1995 |
| WO | 2015116516 A1 | 8/2015 |

* cited by examiner

METHOD AND DEVICE FOR DETERMINING AN N+1-DIMENSIONAL ENVIRONMENT MODEL AND MINING APPARATUS

CROSS REFERENCE TO RELATED APPLICATIONS

This Application is the U.S. National Stage of International Application No. PCT/2015/012839 filed 26 Jan. 2015 and claims the benefits thereof. The International Application claims the benefits of U.S. Provisional Application No. 61/933,623 filed 30 Jan. 2014. All of the Applications are incorporated by reference herein in their entirety.

FIELD OF INVENTION

The present invention relates to a method and a device for determining an N+1-dimensional environment model. Further, the present invention relates to a mining apparatus.

BACKGROUND OF INVENTION

In mining, many operations follow similar procedures, such as excavating or loading, for instance. The same sequence of actions has to be repeatedly executed. This gives a high potential for the application of autonomous systems. Yet, most machines currently used in mining (shovel excavators, trucks, etc.) are manually operated.

An autonomous system requires tasks such as perceiving the environment, processing the data, reasoning and deriving applicable actions from the internal knowledge and, finally, executing these actions. The task of perceiving the environment generally comprises determining a two- or three-dimensional model of the environment.

Typically, sensors, such as optical, radar or acoustic sensors, are employed for the perception task. Yet, the selection of appropriate sensors which, on the one hand, provide sufficient information and, on the other hand, are affordable in terms of cost is often times difficult. Further aspects relevant in the selection of appropriate sensors are their operability as well as their mounting complexity.

Accordingly, it is an object of the present invention to provide an improved method and device for determining an N+1-dimensional environment model. It is a further object of the present invention to provide an improved mining apparatus.

SUMMARY OF INVENTION

According to a first aspect, a method for determining an N+1-dimensional environment model is provided. Therein, environmental information in N dimensions is determined using at least one sensor. Further, the position and/or orientation of the at least one sensor is determined. In a further step, the N+1-dimensional environment model is determined based on the determined environmental information in N dimensions and the determined position and/or orientation of the at least one sensor.

One idea is to use a simple and therefore low-cost sensor to determine the environmental information in N dimensions, and then add another dimension by determining the position and/or orientation of the at least one sensor. Thus, the present solution reduces automation costs as sensor costs are reduced. An autonomous system may hence be obtained more easily with the benefits of reduced manpower, increased safety and greater efficiency.

The steps of determining the environmental information in N dimensions using at least one sensor, determining the position and/or orientation of the at least one sensor, and determining the N+1-dimensional environmental model based on the determined environmental information in N dimensions and the determined position and/or orientation of the at least one sensor may be repeated as required. Further, the sequence of these steps may be changed as required. Particularly, they are not limited to the order in which they are arranged in the claims. Also, some steps may be repeated before proceeding to the next step.

In particular, the method may include changing the position and/or orientation of the at least one sensor. This step may occur after determining the environmental information in N dimensions and the position and/or orientation of the at least one sensor, and may be repeated as required.

For example, a single sensor is provided, which is configured for determining environmental information in two (N=2) dimensions. By determining the position and/or orientation of the single sensor as well as changing the single sensor's position and/or orientation, a three (2+1)-dimensional environment model may be determined. Or, for example, two separate sensors are provided, each sensor being configured for determining environmental information in exactly one dimension (N=2, since two sensors are used). The additional ($3^{rd}$) dimension is then added by determining the position and/or orientation of both sensors as well as changing their position and/or orientation. According to another example, the environmental information is determined in one dimension (N=1) and the environmental model is two-dimensional.

"Determining" as used herein includes measuring of at least one parameter and/or processing of data and/or information.

"Position" of the at least one sensor refers to the position of the at least one sensor along at least one of the three spatial axis, herein referred to as x, y and z. "Orientation" refers to the orientation of the at least one sensor around at least one of the spatial axis.

N is an integer greater than or equal to 1 (N≥1).

According to an embodiment, the at least one sensor is mounted to a machine part, the machine part being moveable along or rotatable about a machine axis, and wherein the position and/or orientation of the at least one sensor is changed by moving the at least one sensor together with the machine part along or around the machine axis.

No additional actuators are required to determine the environmental information with more degrees of freedom than the at least one sensor as such can provide. By avoiding additional actuators, the mounting, installation and operation complexity is reduced. The machine may be a mining apparatus or any other earth-moving apparatus. The at least one sensor may be mounted releasably or fixedly to the machine part, for example by screws or welding, respectively. According to a further embodiment, environmental information in the $N^{th}$ dimension is determined in a direction normal to the measuring direction or measuring plane of the at least one sensor.

"Measuring direction" refers to a sensor determining the environmental information in a single dimension only. For example, a laser sensor sending out a beam of light, the beam of light being reflected and a distance thereby being determined, would be one example of a sensor having a measuring direction. On the other hand, "measuring plane" refers to a sensor measuring environmental information in two dimensions. An example of such a sensor is a laser scanner having a beam of light scanning the environment in a single plane.

For example, the measuring direction is orientated normal to the machine axis. "Normal" herein encompasses deviations of up to 45°, preferably of up to 10°, and further preferably up to 3°. The measuring plane may be orientated normal to the machine axis, or the machine axis may lie in the measuring plane.

According to a further embodiment, the position and/or orientation of the at least one sensor is determined based on data provided by a control unit for controlling a position and/or orientation of the machine part along or about the machine axis.

"Controlling" herein encompasses closed-loop and open-loop control of the machine part along or about the machine axis. For example, the control unit may provide output signals to one or more actuators actuating the machine part along or about the machine axis. These output signals may represent the data based on which the position and/or orientation of the at least one sensor is determined. Alternatively, the control unit may comprise one or more sensors for sensing the position and/or orientation of the machine part along or about the machine axis. The signal from the one or more sensors may represent the data based on which the position and/or orientation of the at least one sensor is determined.

According to a further embodiment, the determined position and/or orientation of the at least one sensor provided by the control system is matched to the determined environmental information.

For example, time stamps of the data provided by the control unit and time stamps of the environmental information provided by the at least one sensor may differ. In a matching process, the data and/or environmental information is processed, for example by interpolation, in order to provide data and environmental information allocated to the same time stamps.

According to a further embodiment, the environmental information in N dimensions and the position and/or orientation of the at least one sensor are determined in parallel or sequentially.

For example, first, the environmental information is determined and, second, the position and/or orientation of the at least one sensor is determined. Alternatively, the environmental information and the position and/or orientation of the at least one sensor are determined at the same time, or these processes may overlap.

According to a further embodiment, the at least one sensor is configured to determine the environmental information in exactly N dimensions.

Thus, changing the position and/or orientation of the at least one sensor and determining the position and/or orientation of the at least one sensor adds a further dimension to the environment model.

According to a further embodiment, the machine part is powered to move along or rotate about the machine axis in order to modify the environment.

"Powered" means that at least one actuator is provided for driving the machine part. "Modifying the environment" means to change the position and/or orientation of objects or substance. Examples are moving earth, drilling holes or moving other objects, such as devices or machines.

According to a further embodiment, the machine part is powered electrically, hydraulically or pneumatically.

For example, an electric or hydraulic motor or a hydraulic or pneumatic piston may drive the machine part.

According to a further embodiment, the mining apparatus comprises the machine part.

For that matter, also any other earth moving apparatus may comprise the machine part.

According to a further embodiment, the machine part is a mining excavator.

In particular, the machine part can be a house, boom or bucket. These machine parts, amongst others, need to be positioned and/or oriented accurately with respect to the environment, for example with respect to human beings, haul trucks or other material.

According to a further embodiment, the at least one sensor is a laser scanner for scanning the environment in a single measuring plane.

Other sensors, such as radar sensors, optical sensors or acoustic sensors may also be employed.

According to a further embodiment, at least two sensors are provided, and wherein measuring planes of the at least two sensors intersect or are arranged in parallel to each other.

According to an embodiment, the measuring planes of the at least two sensors may intersect in the machine axis. In the embodiment in which the measuring planes of the at least two scanners intersect, data provided by one sensor may be overwritten by data provided by the other sensor. Thereby, the environmental model may be updated quickly. On the other hand, in an exemplary embodiment in which the measuring planes of the at least two sensors are arranged parallel to each other, one sensor may see and detect parts of the environment which the other sensor cannot see and detect. Thus, a better 3D model may be obtained.

Any embodiment of the first aspect relating to a method for determining an N+1-dimensional environmental model may be combined with any embodiment of the first aspect to obtain another embodiment of the first aspect.

According to a second aspect, the present invention relates to a computer program product comprising a program code for executing at least one step (or all steps) of the above discussed method for determining an N+1-dimensional environmental model when run on at least one computer.

A computer program product, like a computer program means, may be embodied as a memory card, USB stick, CD-ROM, DVD or as a file which may be downloaded from a server in a network. For example, this may be provided by transferring the respective file with the computer program product from a wireless communication network.

According to a third aspect, a device for determining an N+1 environmental model is provided. The device comprises at least one sensor for determining environmental information in N dimensions, a determining unit for determining the position and/or orientation of the at least one sensor, and a processing unit for determining the N+1 dimensional environmental model based on the determined environmental information in N dimensions and the determined position and/or orientation of the at least one sensor.

The respective entity (unit), e.g. the determining unit, the processing unit or a control unit, may be implemented in hardware and/or in software. If said entity (unit) are implemented in hardware, it may be embodied as a device, e.g. as a computer or as a processor or as a part of a system, e.g. a computer system. If said entity (unit) are implemented in software it may be embodied as a computer program product, as a function, as a routine, as a program code or as an executable object.

Further, the device may comprise a positioning/orientating unit for changing the position and/or orientation of the at least one sensor.

According to a fourth aspect, a mining apparatus comprising the device described herein is provided.

Generally, the apparatus may also be configured as any other kind of earth-moving apparatus, for example.

Features explained in connection with the method apply mutatis mutandis to the device and apparatus, and vice versa.

Further objects, features and advantages of the present invention will become apparent from the subsequent description and depending claims, taking in conjunction with the accompanying drawings, in which:

BRIEF DESCRIPTION OF THE DRAWINGS

In the Figures, like reference numerals designate like or functionally equivalent elements, unless otherwise indicated.

DETAILED DESCRIPTION OF INVENTION

Figure 1:
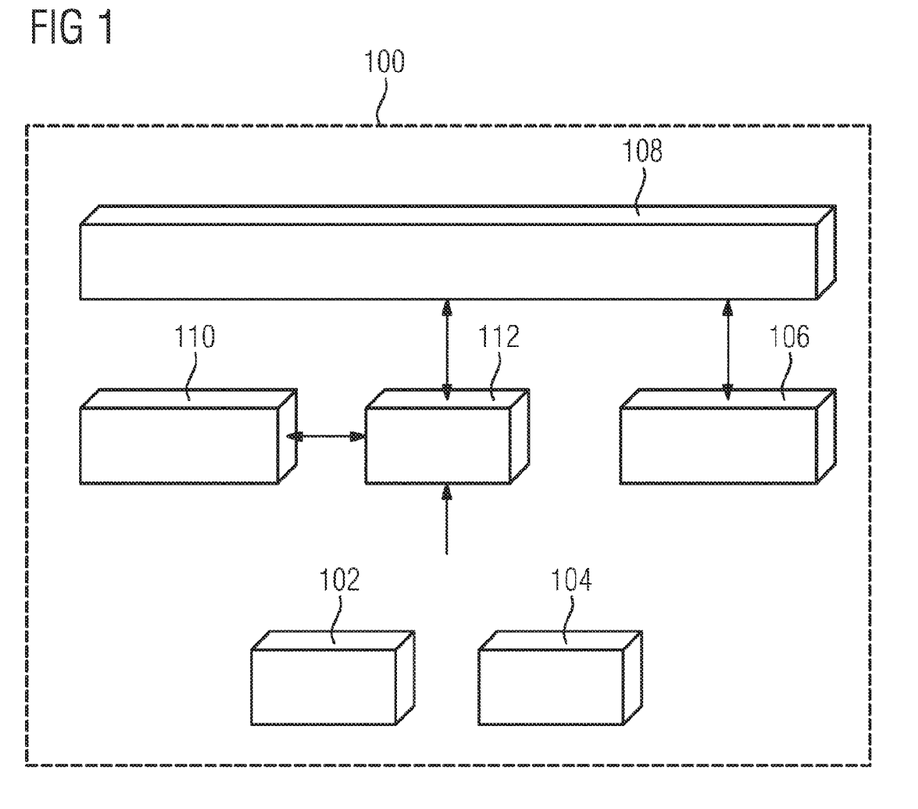
FIG. 1 shows schematically a device for determining an N+1 dimensional environmental model according to one embodiment.
Figure 2:
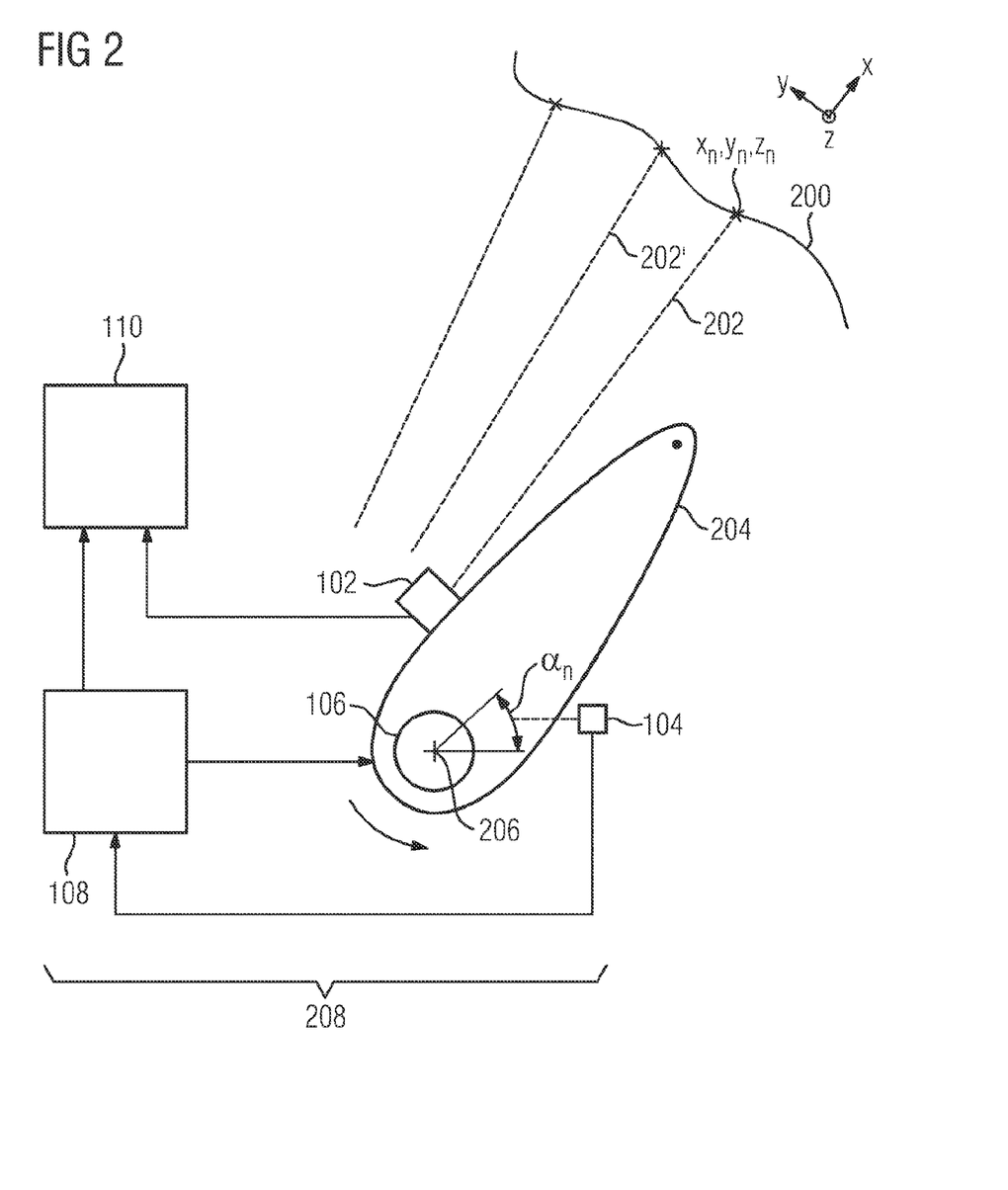
FIG. 2 illustrates some of the components used in the device of FIG. 1 in more detail.
Figure 9:
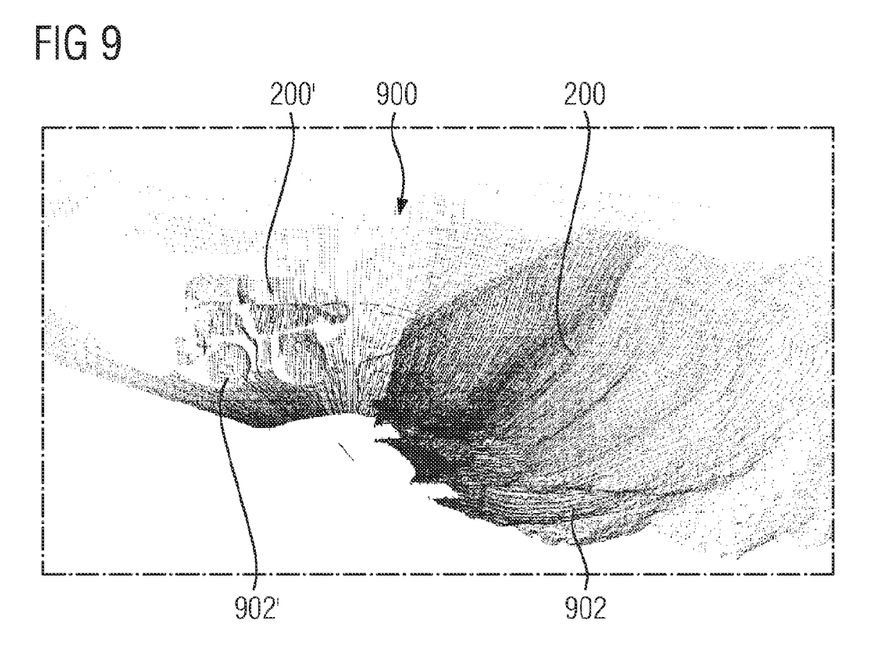
FIG. 9 illustrates an example of a three-dimensional environmental model in accordance with an exemplary embodiment of the present invention.

FIG. 1 illustrates a device 100 for determining an N+1-dimensional environmental model. For example, the N+1-dimensional model may be a two-dimensional environmental model or three-dimensional environmental model. A three-dimensional environmental model 900 is shown in FIG. 9. The device 100 comprises, for example, a sensor 102 and a further sensor 104. The sensor 102 is configured for determining environmental information in N dimensions. For example, the sensor 102 is a laser scanner for scanning the environment 200 in the x-z-plane, i.e. two dimensions, as illustrated in FIG. 2. Reference numeral 202 illustrates a laser beam sent out by the sensor 102 for gauging the point $x_n$, $y_n$, $z_n$ on the contour of the environment 200.

Instead of the single sensor 102, for example, two sensors determining the environmental information in a single dimension only and having different orientations could be used. The sensor 102 may be configured to not only measure the environment 200, but also to process the measured data. The determined environmental information may thus correspond to the measured parameter or processed data.

Figure 5:
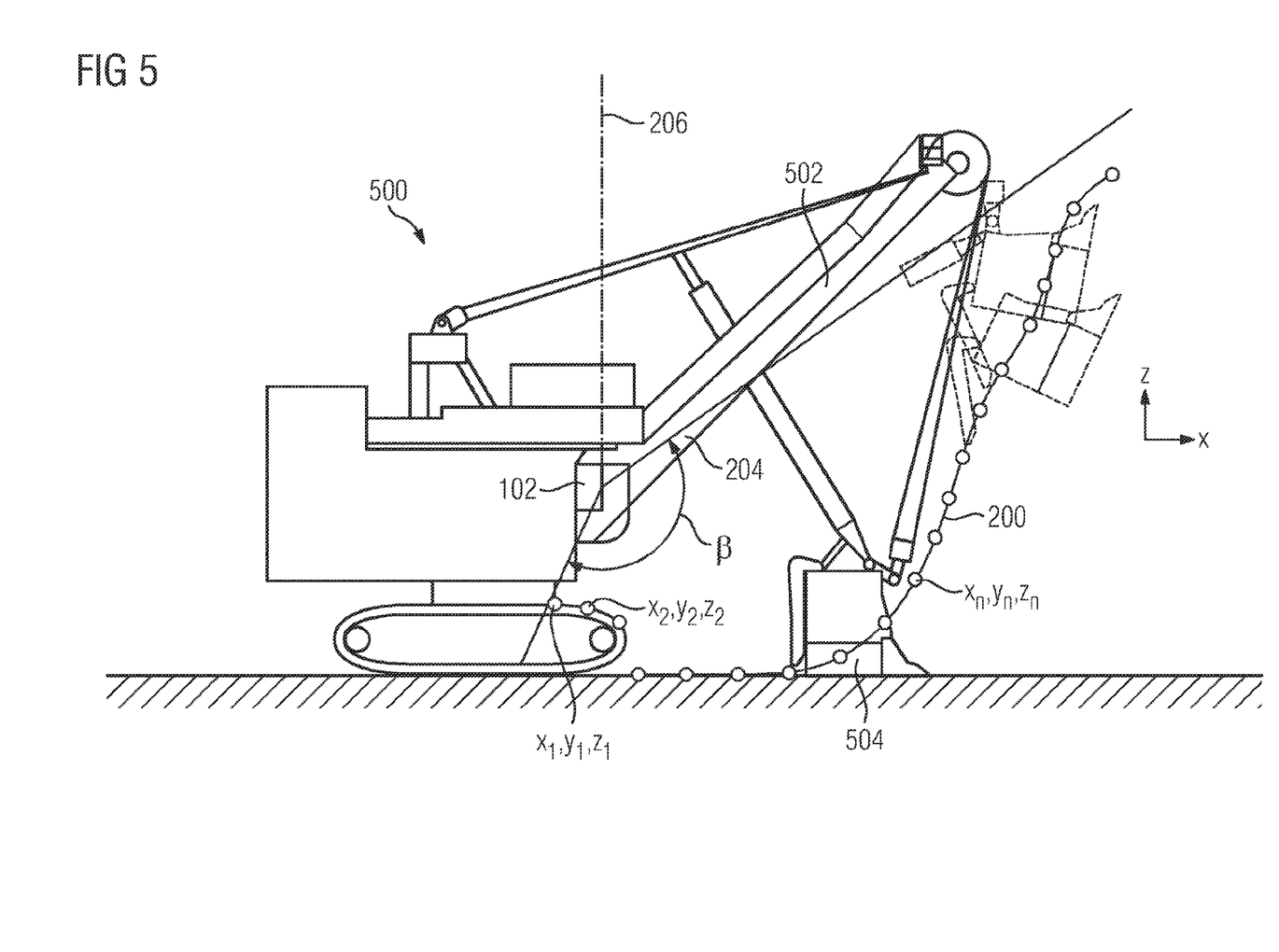
FIG. 5 illustrates a mining apparatus in a side view in accordance with an exemplary embodiment of the present invention.

The sensor 102 is fixedly attached to a machine part 204, for example by means of screws or welding. The machine part 204 is, for example, part of a mining apparatus or any other earth-moving apparatus. One example of a mining apparatus 500 is shown in FIG. 5.

Returning to FIG. 2, it is shown that the machine part 204 is rotatable about a machine axis 206. In an alternative embodiment, the machine part 204 may be moveable along the machine axis 206.

According to FIG. 1 and FIG. 2, the device 100 can comprise, for example, an actuator 106 configured for rotating the machine part 204 about the machine axis 206. As illustrated in FIG. 2, the actuator 106 may be configured as a motor, for example an electric, a hydraulic or a pneumatic motor, providing for the rotation of the machine part 204.

As the machine part 204 rotates about the machine axis 206, the sensor 102 rotates together with the machine part 204 about the machine axis 206. By moving the sensor 102 around the machine axis 206, the environmental information in the $N^{th}+1$ dimension is determined. For example, if the sensor 102 is configured to determine the environmental information in exactly one dimension, the rotation of the sensor 102 adds a second dimension to the environmental information obtained. Or, as already explained in connection with FIG. 2, the sensor 102 may determine the environmental information in exactly two dimensions. By now rotating the sensor 102 about the machine axis 206 together with the machine part 204, the orientation of the sensor 102 with respect to the environment 200 changes, and thus the environmental information determined in the y-direction, i.e. in a direction normal to the x-z-plane, changes.

In FIGS. 1 and 2, it is shown that the device 100 may further comprise a controller 108 for controlling the actuator 106. In the present example, the further sensor 104 measures the angle of rotation $\alpha_n$ of the machine part 204 around the machine axis 206 as shown in FIG. 2. The angle $\alpha_n$ is returned to the controller 108. Thus, a closed-loop control is provided. The thus formed control unit is designated with reference numeral 208 in FIG. 2 and is a closed-loop control system. Alternatively, the control unit 208 may be configured as an open-loop control system.

The device 100 can further have a processing unit 110 configured for determining an N+1-dimensional environmental model, e.g. the three dimensional environmental model 900 of FIG. 9.

The environmental model is determined based on the determined environmental information in N dimensions. In FIG. 2, this information is the environmental information $x_n$, $z_n$. Further, the N+1-dimensional environmental model is determined based on the information $\alpha_n$ of the sensor 102. From the angle $\alpha_n$, the processing unit 110 deduces the coordinate $y_n$ corresponding to the environmental information $x_n$, $z_n$. Thus, a three-dimensional environmental model is obtained.

Figure 3:
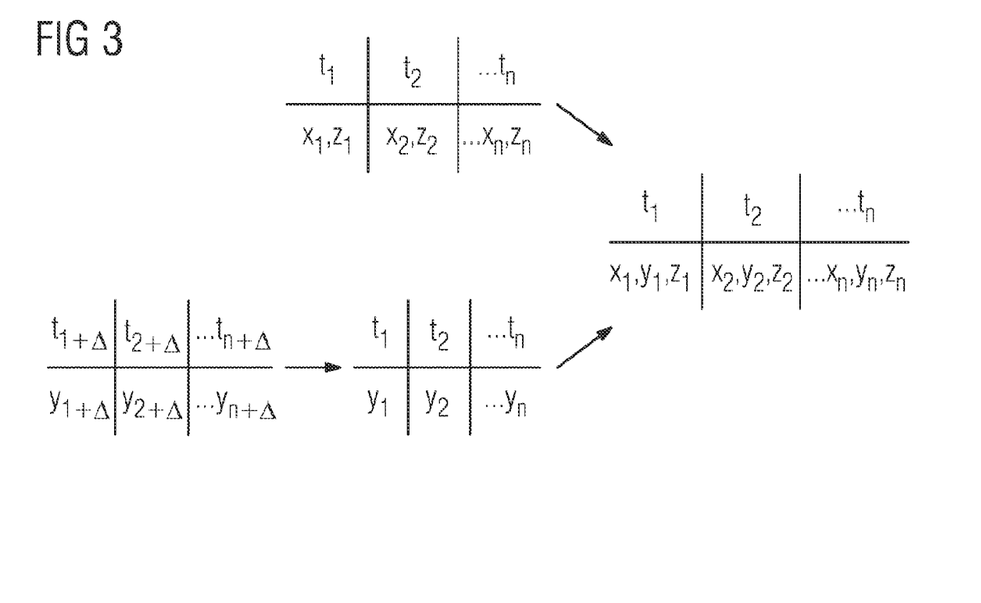
FIG. 3 illustrates a data matching process in accordance with an exemplary embodiment of the present invention.

The processing unit 110 may also be configured to match the determined sensor orientation $\alpha_n$ to the respective determined environmental information $x_n$, $z_n$. This process is illustrated in FIG. 3. FIG. 3 shows that the environmental information $x_n$, $z_n$ is obtained at time stamps $t_n$, whereas the sensor orientation $\alpha_n$ and therefore the coordinate $y_n$ are determined at time stamps $t_{n+\Delta}$. The matching process may comprise interpolation techniques to obtain coordinates $y_n$ at $t_n$. Thus, a set of coordinates $x_n$, $y_n$, $z_n$ at $t_n$ is determined.

Referring again to FIG. 1, the sensors 102, 104, the actuator 106, the controller 108 and the processing unit 110 may form a communication network which may be USB-, Ethernet-or PROFINET-based, for example. In the embodiment of FIG. 1, the device 100 comprises a hub 112 configured to route communication between the sensors 102, 104, the controller 108 and the processing unit 110.

Figure 4:
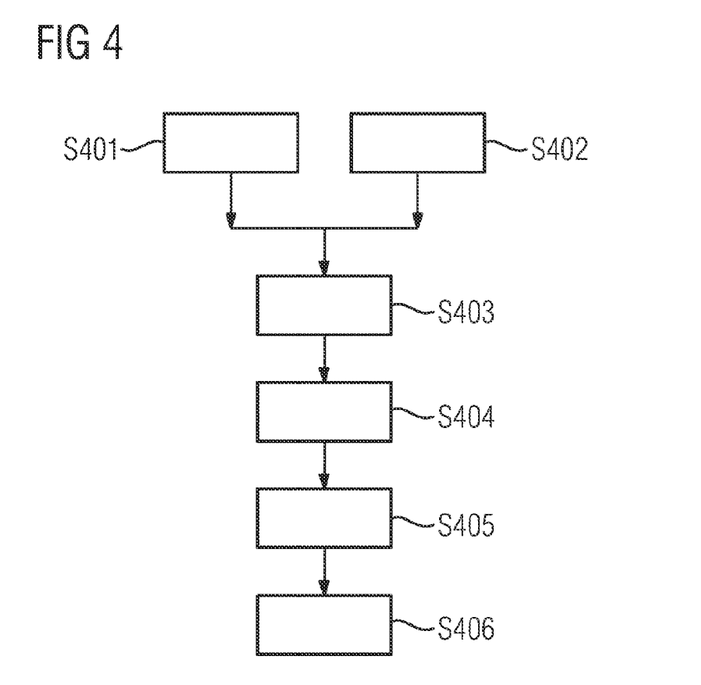
FIG. 4 shows an embodiment of a sequence of method steps for determining an N+1-dimensional environmental model in accordance with an exemplary embodiment of the present invention.

FIG. 4 illustrates method steps executed by the device 100 of FIG. 1 in accordance with an exemplary embodiment of the present invention.

In step S401, the sensor 102 determines the environmental information $x_n, z_n$.

Before, in parallel or thereafter, the further sensor 104 determines the orientation of the machine part 204 in step S402.

In step S403, the data provided by the sensors 102, 104 is transferred via the communication network to the processing unit 110.

The data is processed by the processing unit 110 in step S404 to provide a three dimensional model as described. This processing may encompass data matching as described above. Further, this data processing may encompass data interpretation, in particular feature extraction. For example, a set of coordinates $x_n, y_n, z_n$ may be compared to known environmental features, for example slopes, hills, dug-outs, human beings, trucks or other objects. In this manner, the three dimensional environmental model may be further refined.

In step S405, the processing unit 110 or a further processing unit (not shown), to which the three dimensional environmental model is being transferred, decides on actions to be executed by the actuator 106. For example, a trajectory of the machine part 204 is planned based on the determined three dimensional environmental model so as to avoid collision with an object or so as to complete a certain task, for example moving a bucket from a first position to a second position.

Once the actions are planned, the corresponding data is transferred to the controller 108, which then executes the actions by giving corresponding commands to the actuator 106. The actuator 106 hence moves the machine part 204 around the machine axis 206 as defined by the corresponding control commands (step S406). Thereby, the orientation $\alpha_n$ of the sensor 102 changes, thus moving the x-z-plane (measuring plane) to a new position as indicated by the laser beam 202' (see FIG. 2). At the new position, the environmental information as well as the orientation of the sensor 102 is obtained, and the environmental model is updated accordingly.

Thus, as the machine part 204 moves to complete tasks corresponding to a mining or other earth-moving function, a three-dimensional environmental model is obtained and continuously updated. No additional actuators are required to move the sensor 102. In addition, the sensor 102 may thus have a simple design.

Figure 6:
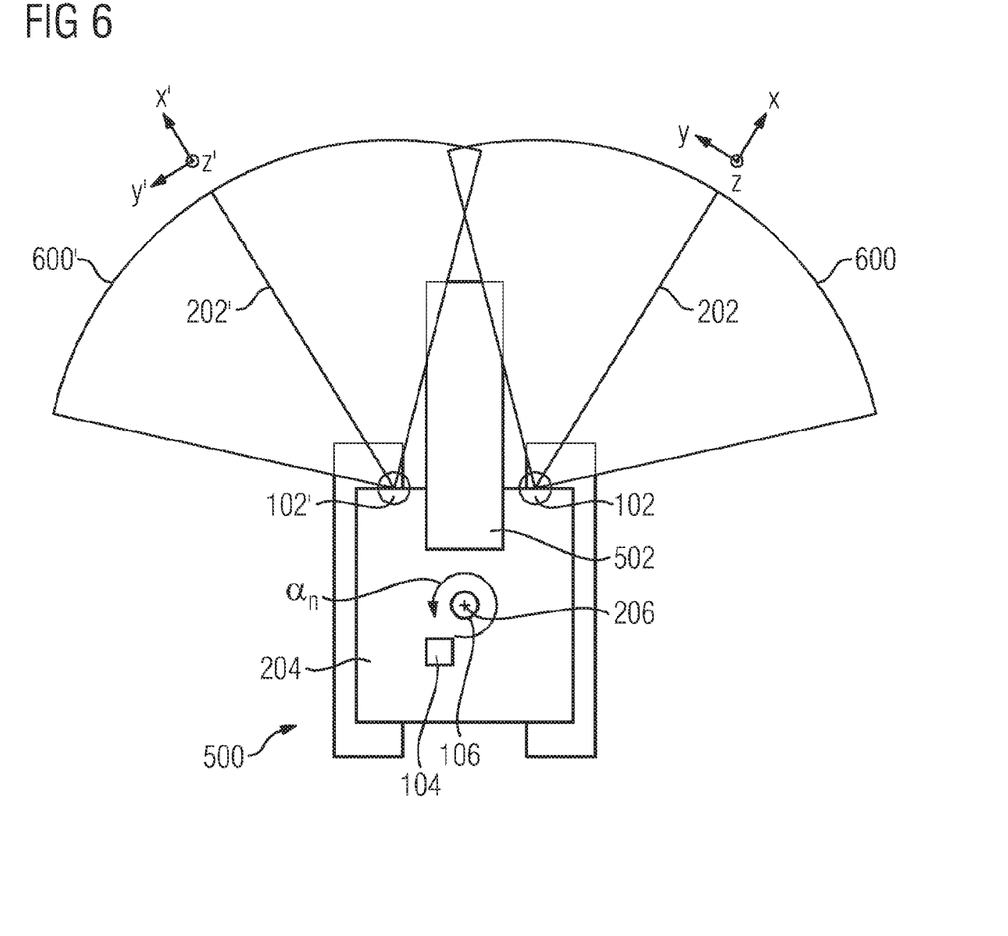
FIG. 6 illustrates the mining apparatus of FIG. 5 in a top view.

FIG. 5 shows a mining apparatus 500, and FIG. 6 shows the mining apparatus 500 of FIG. 5 in a top view. The mining apparatus 500 is for example configured as a shovel excavator. The mining apparatus 500 comprises the device 100 as explained in connection with FIGS. 1 to 4.

In the example of FIGS. 5 and 6, two sensors 102, 102' are provided which are mounted to a shovel 204, in particular to the house, of the mining apparatus 500 respectively. For example, the sensors 102, 102' may be mounted to the left and right of a boom 502. The boom 502 is connected at least indirectly to a bucket 504 shown in FIG. 5. As the shovel 204 rotates in the horizontal plane about its axis 206, the bucket 504 is operated to move earth in the horizontal plane, for example. An electric or hydraulic motor 106 may drive the shovel 204 to rotate about the axis 206.

The sensors 102, 102' may be configured for example as laser scanners, respectively, scanning across an angle β of, for example, 135° in the x-z-plane. The sensors 102, 102' may be orientated forward of the mining apparatus 500 so as to scan a bank 200 in front of the mining apparatus 500. Scanned points on the contour of the bank 200 are designated $x_n, y_n, z_n$. Again, the sensors 102, 102' are configured for determining the coordinates $x_n, z_n$ only, and the coordinate $y_n$ is obtained from the further sensor 104 monitoring the angular position $\alpha_n$ of the shovel 204.

FIG. 6 illustrates two 3D scan volumes 600, 600' obtained, when the sensors 102, 102' gauge the environment 200 in the x-z/x'-z'-plane and are being rotated around the machine axis 206, respectively. In this manner, two environmental submodels 902, 902' (see FIG. 9) may be obtained, which are then fused by the processing unit 110 to a single environmental model 900. To this end, the scan volumes 600, 600' may overlap as also shown in FIG. 6. In the example of FIG. 9, the bank 200 and a truck 200' to the left of the mining apparatus 500 are illustrated.

Figure 7A:
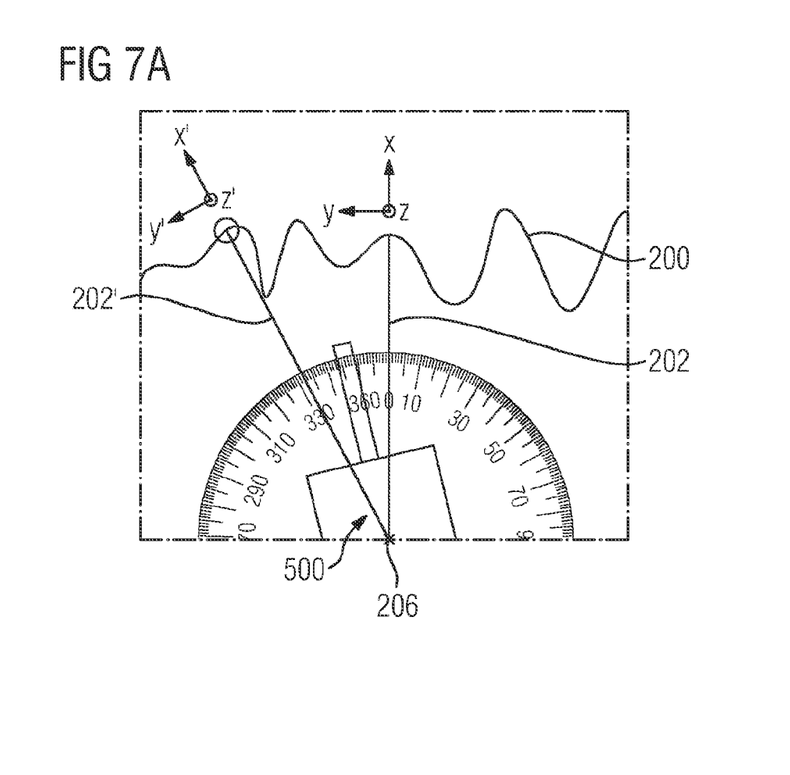
FIGS. 7A and 7B illustrate the measuring principle used in the embodiment of FIG. 6 in more detail.
Figure 7B:
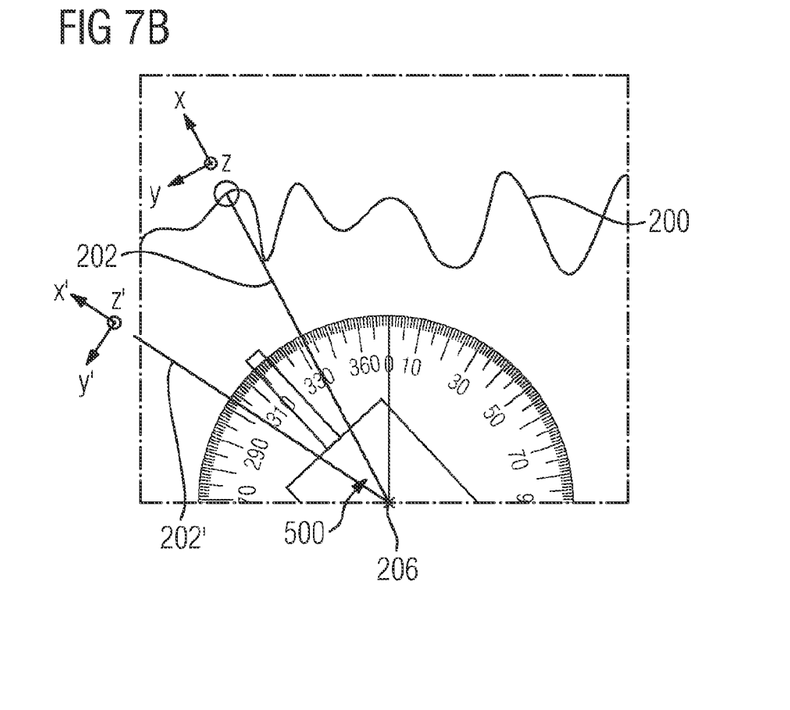

In the example of FIGS. 5 and 6, the scanning planes x-z, x'-z' each intersect the axis of rotation 206. Thus, environmental information x', z' coming from the sensor 102' can be overwritten with environmental information x, z coming from the sensor 102, as the shovel 204 turns counter-clockwise as illustrated in FIGS. 7A and 7B. This can be done because it is known that the environmental information x, z coming from the right sensor 102 represents the exact same heading as the environmental information x', z' coming from the sensor 102' on the left. While the environmental information itself might be different due to changes in the environment, the newly determined environmental information is the most accurate representation of the environment. Using this technique allows the environmental model 900 to be updated quickly.

As the shovel 204 swings back again in the clockwise direction, for example from the truck 200' to the bank 200, which may represent the digging position, the sensor 102 on the right will update the shape of the bank 200. Meanwhile, the other sensor 102' will detect the truck 200' and determine how full the truck 200' is, for example (see FIG. 9).

Figure 8A:
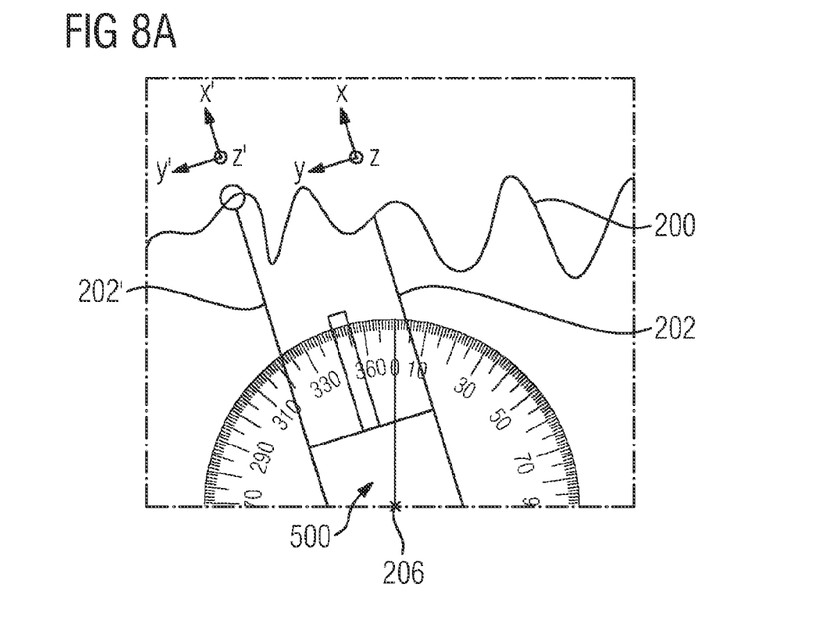
FIGS. 8A and 8B illustrate an alternative embodiment with respect to FIGS. 7A and 7B.
Figure 8B:
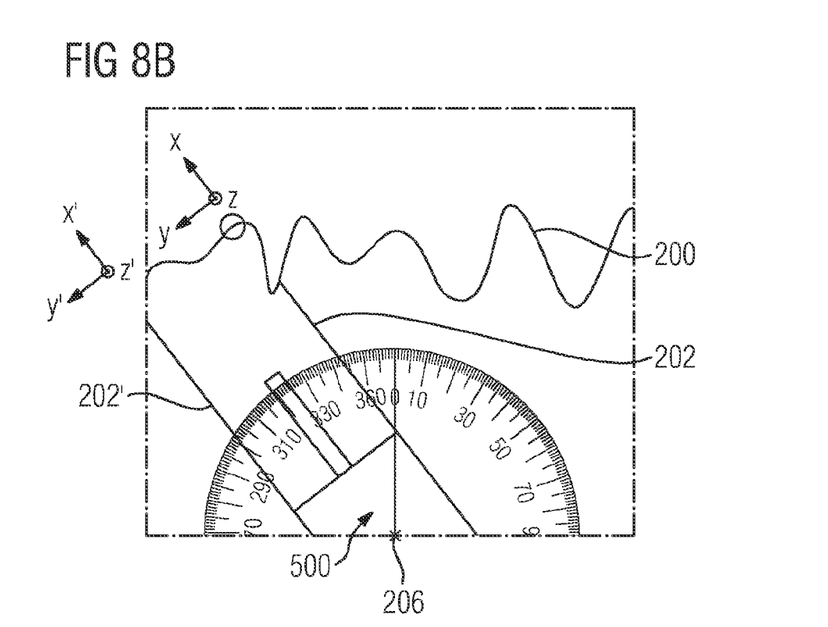

Alternatively, the sensors 102, 102' may be arranged as depicted in the FIGS. 8A and 8B. Therein, the scanning planes x-z, x'-z' are oriented parallel to each other and do not intersect the axis of rotation 206. According to this embodiment, the sensors 102, 102' gauge the environment 200 from different angles, which is why additional environmental information may be obtained in this manner. In particular, an improved three dimensional environmental model from the perspective of the mining apparatus 500 may be obtained.

Although the present invention has been described in accordance with preferred embodiments, it is obvious for a person skilled in the art that modifications are possible in all embodiments.

REFERENCE NUMERALS 100 device
102 sensor
102' sensor
104 sensor
106 actuator
108 controller
110 processing unit
112 hub
200 environment
200' truck
202 laser beam
202' laser beam 204 machine part
206 machine axis
208 control unit
500 mining apparatus
502 boom
504 bucket
600 scan volume
600' scan volume
900 environmental model
902 environmental submodel
902' environmental submodel
S401-S406 method steps
x spatial direction
x' spatial direction
y spatial direction
y' spatial direction
z spatial direction
z' spatial direction
x-z plane
x'-z' plane
α angle
β angle

The invention claimed is:

1. A method for determining an environmental model in multiple dimensions, comprising:
  determining environmental information in first and second dimensions using a first sensor and a second sensor, the first sensor comprising a laser scanner,
  determining a position and/or orientation of the first sensor, and
  changing the position and/or orientation of the first sensor by moving the first sensor together with a machine part along or around a machine axis, thereby scanning an environment in two dimensions,
    the first sensor being mounted to the machine part, and the machine part being moveable along or rotatable about the machine axis, the machine part comprising a house, boom, bucket or shovel of a mining excavator,
    wherein the determining and changing of the position and/or orientation of the first sensor provide environmental information in a third dimension by rotating the first sensor around the machine axis, and
  determining a three-dimensional environmental model based on the environmental information and the position and/or orientation of the first sensor in the first, second and third dimensions, and
  wherein the second sensor measures an angle of rotation of the machine part around the machine axis and provides the angle to a control unit.

2. The method as claimed in claim 1, wherein the position and/or orientation of the first sensor is determined based on data provided by the control unit for controlling a position and/or orientation of the machine part along or about the machine axis.

3. The method as claimed in claim 2, wherein the position and/or orientation of the first sensor provided by the control unit is matched to the environmental information.

4. The method as claimed in claim 1, wherein the environmental information and the position and/or orientation of the first sensor are determined in parallel or sequentially.

5. The method as claimed in claim 1, wherein the machine part is powered to move along or rotate about the machine axis in order to modify the environment.

6. The method as claimed in claim 5, wherein the machine part is powered electrically, hydraulically or pneumatically.

7. A device for determining an environmental model in multiple dimensions comprising:
  a first sensor and a second sensor for determining environmental information in first, second and third dimensions, the first sensor comprising a laser scanner,
  a control unit for determining a position and/or orientation of the first sensor, the first sensor being mounted to a machine part moveable along or rotatable about a machine axis, the machine part comprising a house, boom, bucket or shovel of a mining excavator,
  wherein the position and/or orientation of the first sensor is changed by moving the first sensor together with the machine part along or around the machine axis, thereby scanning an environment in two dimensions, and
  wherein the determining and changing of the position and/or orientation provide environmental information in a third dimension by rotating the first sensor around the machine axis, and
  wherein the second sensor measures an angle of rotation of the machine part around the machine axis and provides the angle to a control unit and
  a processing unit for determining a three-dimensional environmental model based on the environmental information and the position and/or orientation of the first sensor in the first, second and third dimensions.

8. The device as claimed in claim 7, wherein the control unit provides data for controlling a position and/or orientation of the machine part, and wherein the position and/or orientation of the first sensor is determined based on the data provided by the control unit.

9. A mining apparatus comprising:
  a first sensor and a second sensor for determining environmental information in first, second and third dimensions, the first sensor comprising a laser scanner,
  a control unit for determining a position and/or orientation of first sensor,
  a machine part moveable along or rotatable about a machine axis, the first sensor being mounted to the machine part, the machine part comprising a house, boom, bucket or shovel of a mining excavator,
  wherein the position and/or orientation of the first sensor is changed by moving the first sensor together with the machine part along or around the machine axis, thereby scanning an environment in two dimensions, and
  wherein the determining and changing of the position and/or orientation provide environmental information in a third dimension by rotating the first sensor around the machine axis
  wherein the second sensor measures an angle of rotation of the machine part around the machine axis and provides the angle to a control unit, and
  a processing unit for determining a three-dimensional environmental model based on the environmental information and the position and/or orientation of the first sensor in the first, second and third dimensions.

* * * * *